(12) United States Patent
Deng

(10) Patent No.: US 11,315,367 B2
(45) Date of Patent: Apr. 26, 2022

(54) METHOD AND APPARATUS FOR CONTROLLING VEHICLE OPERATIONS AND COMPUTER DEVICE

(71) Applicant: BAIDU ONLINE NETWORK TECHNOLOGY (BEIJING) CO., LTD., Beijing (CN)

(72) Inventor: Xiaofan Deng, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 251 days.

(21) Appl. No.: 16/553,892

(22) Filed: Aug. 28, 2019

(65) Prior Publication Data

US 2020/0074763 A1    Mar. 5, 2020

(30) Foreign Application Priority Data

Aug. 30, 2018 (CN) .......................... 201811004978.X

(51) Int. Cl.
*G07C 5/00* (2006.01)
*B60W 40/09* (2012.01)
(Continued)

(52) U.S. Cl.
CPC ............. *G07C 5/008* (2013.01); *B60W 40/09* (2013.01); *G05D 1/0022* (2013.01);
(Continued)

(58) Field of Classification Search
CPC ..... G07C 5/008; G07C 5/0808; B60W 40/09; B60W 2540/215; B60W 2556/10;
(Continued)

(56) References Cited

U.S. PATENT DOCUMENTS 8,140,358 B1 * 3/2012 Ling ...................... G07C 5/008
705/4
8,311,858 B2 * 11/2012 Everett .................. G07C 5/008
705/4

(Continued)

FOREIGN PATENT DOCUMENTS

CN      103234763 A    8/2013
CN      104269053 A    1/2015
(Continued)

OTHER PUBLICATIONS

Extended European Search Report for EP Application No. 19193054.4, dated Jan. 23, 2020.

*Primary Examiner* — Muhammad Shafi
(74) *Attorney, Agent, or Firm* — Fay Sharpe LLP

(57) ABSTRACT

Provided are a method and an apparatus for controlling vehicle operations, and a computer device. The method includes: acquiring current running status information of an in-vehicle component and current user operating behavior information sent by a first vehicle; determining a current running status score of the first vehicle according to the current running status information of the in-vehicle component and the current user operating behavior information from the first vehicle; and generating an operation strategy for the first vehicle according to the current running status score of the first vehicle.

18 Claims, 4 Drawing Sheets

(51) Int. Cl.
    *G05D 1/00* (2006.01)
    *H04W 4/48* (2018.01)
(52) U.S. Cl.
    CPC ......... *G05D 1/0027* (2013.01); *G05D 1/0088* (2013.01); *H04W 4/48* (2018.02)
(58) Field of Classification Search
    CPC ............ B60W 50/04; B60W 50/0205; B60W 60/001; G05D 1/0088; G05D 1/0022; G05D 1/0027; H04W 4/48; G06Q 50/30; G06Q 10/06393; H04L 67/125
    USPC ....................................................... 701/31.4
    See application file for complete search history.

(56) References Cited

U.S. PATENT DOCUMENTS

| | | | | |
|---|---|---|---|---|
| 9,646,428 | B1* | 5/2017 | Konrardy | G08G 1/09675 |
| 2004/0158476 | A1* | 8/2004 | Blessinger | G06Q 50/205 |
| | | | | 434/65 |
| 2012/0209634 | A1* | 8/2012 | Ling | G06Q 10/0833 |
| | | | | 705/4 |

FOREIGN PATENT DOCUMENTS

| | | | |
|---|---|---|---|
| CN | 105094767 | A | 11/2015 |
| CN | 106373388 | A | 2/2017 |
| CN | 106845659 | A | 6/2017 |
| CN | 106940865 | A | 7/2017 |
| CN | 107640159 | A | 1/2018 |
| CN | 107813775 | A | 3/2018 |
| CN | 108389418 | A | 8/2018 |
| JP | H02-104946 | A | 4/1990 |
| JP | 2017-506782 | A | 3/2017 |

\* cited by examiner

METHOD AND APPARATUS FOR CONTROLLING VEHICLE OPERATIONS AND COMPUTER DEVICE

CROSS-REFERENCE TO RELATED APPLICATION

This application claims priority to and benefits of Chinese Patent Application Serial No. 201811004978.X, filed with the National Intellectual Property Administration of P. R. China on Aug. 30, 2018, the entire content of which is incorporated herein by reference.

FIELD

The present disclosure relates to the field of vehicle technologies, and more particularly to a method and an apparatus for controlling vehicle operations, and a computer device.

BACKGROUND

With the development of the autonomous driving technology, an autonomous vehicle service system has been emerged. However, there is still an urgent demand for improving operation and management of the autonomous vehicle service system.

SUMMARY

In an aspect, the present disclosure provides in embodiments a method for controlling vehicle operations, including: acquiring current running status information of an in-vehicle component and current user operating behavior information sent by a first vehicle; determining a current running status score of the first vehicle according to the current running status information of the in-vehicle component and the current user operating behavior information from the first vehicle; and generating an operation strategy for the first vehicle according to the current running status score of the first vehicle.

In another aspect, the present disclosure provides in embodiments a computer device, including a processor; and a memory for storing computer programs executable by the processor; in which the processor is configured to perform a method for controlling vehicle operations when executing the computer programs, and the method includes: acquiring current running status information of an in-vehicle component and current user operating behavior information sent by a first vehicle; determining a current running status score of the first vehicle according to the current running status information of the in-vehicle component and the current user operating behavior information from the first vehicle; and generating an operation strategy for the first vehicle according to the current running status score of the first vehicle.

In still another aspect, the present disclosure provides in embodiments a non-temporary computer-readable storage medium having stored therein computer programs that, when executed by a processor, cause the processor to perform a method for controlling vehicle operations, including: acquiring current running status information of an in-vehicle component and current user operating behavior information sent by a first vehicle; determining a current running status score of the first vehicle according to the current running status information of the in-vehicle component and the current user operating behavior information from the first vehicle; and generating an operation strategy for the first vehicle according to the current running status score of the first vehicle.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
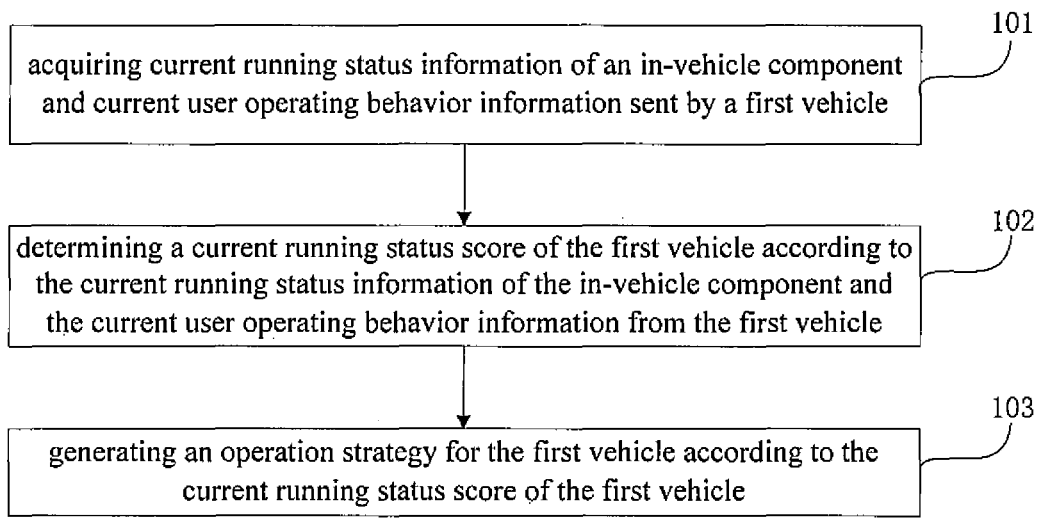
FIG. 1 is a flow chart of a method for controlling vehicle operations according to an embodiment of the present disclosure.

Reference will be made in detail to embodiments of the present disclosure. The same or similar elements and the elements having same or similar functions are denoted by same or like reference numerals throughout the descriptions. The embodiments described herein with reference to drawings are explanatory, illustrative, and configured to generally understand the present disclosure. The embodiments shall not be construed to limit the present disclosure.

In embodiments of the present disclosure, a method for controlling vehicle operations is provided to effectively manage the operation of the autonomous vehicle.

In an embodiment of the present disclosure, a current running status score of a first vehicle is determined according to current running status information of an in-vehicle component and current user operating behavior information from the first vehicle, and an operation strategy for the first vehicle is generated according to the current running status score of the first vehicle. Therefore, the running status of the vehicle can be determined according to the running status of the in-vehicle component and the user operating behavior, and the vehicle can be timely and effectively managed according to the running status of the vehicle, thus improving the efficiency of the vehicle operation and also providing conditions for realizing automation and intelligent management of the vehicle.

A method and an apparatus for controlling vehicle operations and a computer device are described below with reference to the accompanying drawings.

In an aspect, the method for controlling vehicle operations will be specifically described with reference to FIG. 1.

FIG. 1 is a flow chart of a method for controlling vehicle operations according to an embodiment of the present disclosure. As shown in FIG. 1, the method for controlling vehicle operations includes following steps.

In block 101, current running status information of an in-vehicle component and current user operating behavior information sent by a first vehicle are acquired.

Specifically, the method for controlling vehicle operations provided by the embodiments of the present disclosure may be performed by the computer device provided by the embodiments of the present disclosure. The computer device is provided with an apparatus for controlling vehicle operations configured to control the operations of the autonomous vehicle. The computer device in the embodiment may be any hardware device having a data processing function, such as a computer, a server, or the like.

In this embodiment, the first vehicle may be any vehicle, such as a manually driven vehicle, or an autonomous vehicle. The number of the first vehicles may be at least one.

The current user operating behavior information refers to information of operations which are performed by the user manually controls the vehicle to realize different functions. For example, the user may control a steering wheel to adjust a steering angle or step on the accelerator pedal to increase the speed of the vehicle. Alternatively, the current user operating behavior information may also refer to information for controlling the vehicle by voice of the user, such as controlling the speed of the vehicle and the steering angle of the steering wheel.

The current running status information of the in-vehicle component may include an engine speed, an opening degree of a throttle valve and a coolant temperature.

In practice, various control modules are provided in the vehicle, such as an electronic control unit (ECU) and an on-board diagnostic (OBD). Moreover, both the ECU and the OBD can acquire the running status information of the in-vehicle component of the vehicle and the user operating behavior information.

Therefore, in this embodiment, the current running status information of the in-vehicle component and the current user operating behavior information may be acquired by sending an acquisition data request to the ECU or the OBD, or by receiving data or information sent by the ECU or the OBD.

In block 102, a current running status score of the first vehicle is determined according to the current running status information of the in-vehicle component and the current user operating behavior information from the first vehicle.

Alternatively, the acquired current running status information of the in-vehicle component and current user operating behavior information may be used as input data and input into a preset model, and the current running status information of the in-vehicle component and the current user operating behavior information may be calculated in such a preset model, so as to determine the current running status score of the first vehicle.

Specifically, the preset model in this embodiment may be generated according to a large amount of training data.

It should be noted that once the current running status score of the first vehicle is determined, the computer device of the embodiments of the present disclosure can determine whether the current running status of the first vehicle is good or not. Specifically, if it is determined that the current running status score of the first vehicle is high, it indicates that the current running status of the in-vehicle component of the first vehicle is good, the current user operating behaviors are fewer, and the current running status of the first vehicle is good, otherwise it indicates the current running status of the in-vehicle component of the first vehicle is poor, the current user operating behaviors are more, and the current running status of the first vehicle is poor.

In block 103, an operation strategy for the first vehicle is generated according to the current running status score of the first vehicle.

Alternatively, after the current running status score of the first vehicle is determined, the computer device may generate the operation strategy for the first vehicle according to the current running status score of the first vehicle.

In an alternative embodiment of the present disclosure, a table showing a corresponding relationship between an operation strategy and a running status score is preset. With such a table, an operation strategy may be searched and determined according to the current running status score of the first vehicle. The determined operation strategy may be used to control the first vehicle to perform a corresponding task action.

In an embodiment, the corresponding relationship between the operation strategy and the running status score may be preset by experiences of the operators, or may be generated by analyzing a large amount of vehicle operation data.

For example, if the current running status score of the first vehicle is 98 points, the computer device may apply 98 points to perform a search operation in the preset table showing the corresponding relationship between the operation strategy and the running status score. If the operation strategy B is found to be corresponded to 98 points, an operation task may be assigned to the first vehicle according to the operation strategy B, such that the first vehicle will be operated according to the assigned operation task.

It should be understood that in the embodiment of the present disclosure, the running status of the first vehicle is monitored according to the running status information of the in-vehicle component of the first vehicle and the user operating behavior information, such that the first vehicle can be timely and effectively managed according to the running status of the first vehicle, thus improving an efficiency of an autonomous vehicle service and reducing operation cost.

With the method for controlling vehicle operations provided in the embodiments of the present disclosure, the current running status information of the in-vehicle component and the current user operating behavior information sent by the first vehicle are acquired, the current running status score of the first vehicle is determined according to the current running status information of the in-vehicle component and the current user operating behavior information from the first vehicle, and the operation strategy for the first vehicle is generated according to the current running status score of the first vehicle. On this basis, the running status of the vehicle can be determined according to the running status of the in-vehicle component and the user operating behaviors, and the vehicle can be timely and effectively managed according to the running status of the vehicle, thus improving the efficiency of the vehicle operation and also providing conditions for realizing automation and intelligent management of the vehicle.

According to the above analysis, in the embodiment of the present disclosure, the operation strategy corresponding to the first vehicle is generated by the current running status score of the first vehicle determined according to the current running status information of the in-vehicle component of the first vehicle and the user current operating behavior information.

In another embodiment of the present disclosure, a plurality of in-vehicle components of different types may exist. Specifically, an application version of one of the in-vehicle components may vary according to the configurations of the different vehicles. Moreover, for the same type of vehicles, a duration for which a vehicle has been worked is different from that of another vehicle, such that a duration for which the in-vehicle component has been worked is different from that of another in-vehicle component. In view of this, the running status score of the first vehicle may be determined according to a current version of the in-vehicle component and a duration for which the in-vehicle component has been worked, such that the running status score of the first vehicle may be in better consistent with the actual conditions of the vehicle. Therefore, the method for controlling vehicle operations of the present disclosure will be specifically described below with reference to FIG. 2.

Figure 2:
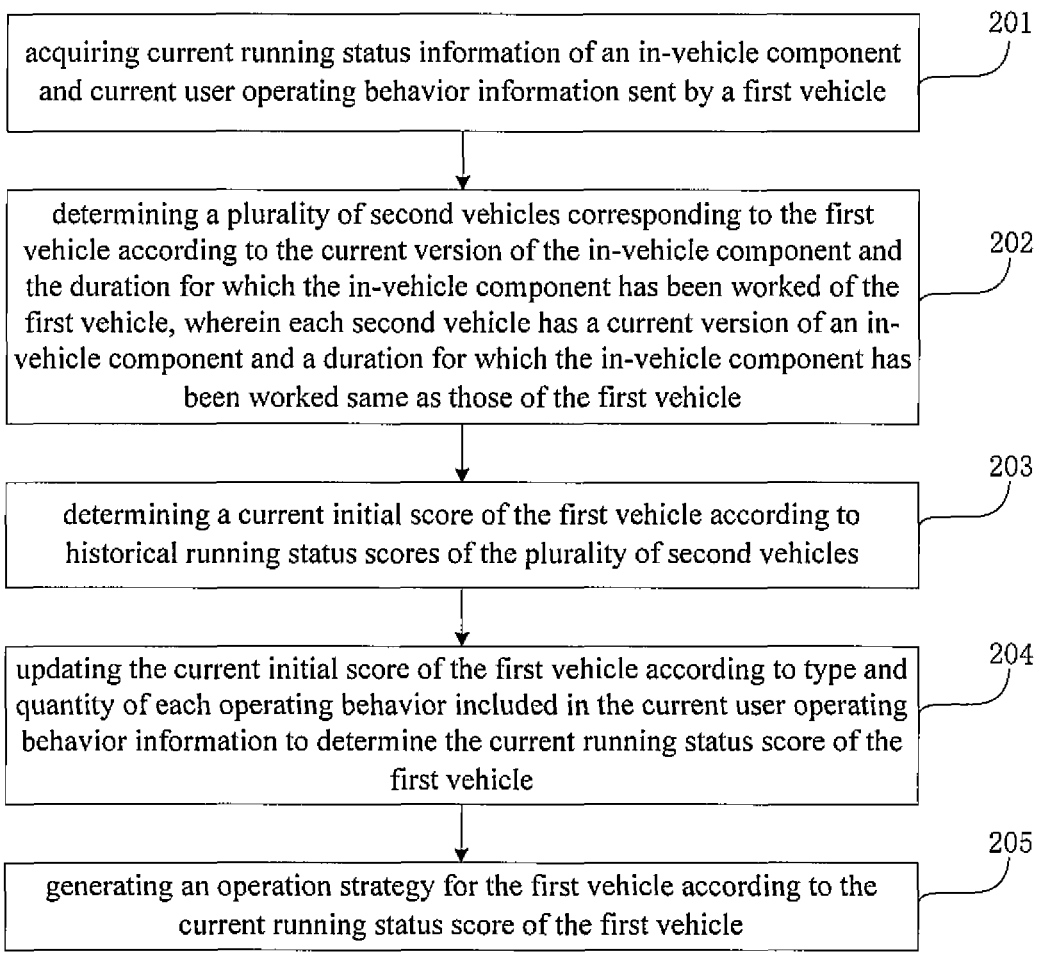
FIG. 2 is a flow chart of a method for controlling vehicle operations according to another embodiment of the present disclosure.

FIG. 2 is a flow chart of a method for controlling vehicle operations according to another embodiment of the present disclosure. As shown in FIG. 2, the method for controlling vehicle operations includes following steps.

In block 201, the current running status information of the in-vehicle component and the current user operating behavior information sent by the first vehicle are acquired.

In block 202, a plurality of second vehicles corresponding to the first vehicle is determined according to the current version of the in-vehicle component and the duration for which the in-vehicle component has been worked of the first vehicle, in which each second vehicle has a current version of an in-vehicle component and a duration for which the in-vehicle component has been worked same as those of the first vehicle.

Alternatively, a plurality of second vehicles corresponding to the first vehicle may be determined by querying a pre-established database. In this embodiment, the pre-established database may include corresponding relationships among a same type vehicle, version information of an in-vehicle component and a duration for which the in-vehicle component has been worked. Specifically, various types of the in-vehicle components may be provided, and one in-vehicle component may have different versions.

Specifically, the pre-established database may be updated as the version of the in-vehicle component and the duration for which the in-vehicle component has been worked change, thus ensuring the accuracy and reliability of the data information stored in the database.

In other words, in this embodiment, the current version of the in-vehicle component and the duration for which the in-vehicle component has been worked of the first vehicle are acquired, and thus a plurality of second vehicles corresponding to the first vehicle may be acquired through the pre-established database.

In block 203, a current initial score of the first vehicle is determined according to historical running status scores of the plurality of second vehicles.

In block 204, the current initial score of the first vehicle is updated according to type and quantity of each operating behavior included in the current user operating behavior information to determine the current running status score of the first vehicle.

During driving, if the running status of the vehicle is good, for example, the running status of the vehicle is well matched to a current road and environmental state, the quantity of the user operating behavior is less, i.e., the operating behaviors manually performed by the user are fewer; and if the running status of the vehicle is not matched to the current road and environmental state, the quantity of the user operating behavior is more. For example, during a driving process, if multiple operations such as "deceleration", "turning to the right", "turning to the left", "parking" and the like are received from the user, it indicates the current running status of the vehicle is poor, i.e., the current running status score of the vehicle is low.

In block 205, an operation strategy for the first vehicle is generated according to the current running status score of the first vehicle.

With the method for controlling vehicle operations provided in the embodiments of the present disclosure, the plurality of second vehicles corresponding to the first vehicle are determined according to the current version of the in-vehicle component and the duration for which the in-vehicle component has been worked of the first vehicle, the current initial score of the first vehicle is determined according to the historical running status scores of the plurality of second vehicles, and the current initial score of the first vehicle is updated according to the current user operating behavior information from the first vehicle to determine the current running status score of the first vehicle, and the operation strategy for the first vehicle is generated according to the current running status score of the first vehicle, such that the operation strategy is generated more relatively for the vehicle, thus realizing a personalized operating management of the vehicle.

According to the above analysis, in the embodiment of the present disclosure, the current initial score of the first vehicle is determined according to the plurality of second vehicles which are determined according to the current version of the in-vehicle component and the duration for which the in-vehicle component has been worked, and the current initial score of the first vehicle is updated according to the current user operating behavior information to determine the current running status score of the first vehicle, and thus the operation strategy is generated according to the current running status score.

In still another embodiment of the present disclosure, the user may perform a maintenance operation on a vehicle which is broken down or has a risk of breakdown. In view of this, a first driving status of the vehicle may be determined according to historical fault and maintenance information, the current running status information of the in-vehicle component and the current user operating behavior information from the first vehicle. Therefore, the method for controlling vehicle operations of the present disclosure will be specifically described below with reference to FIG. 3.

Figure 3:
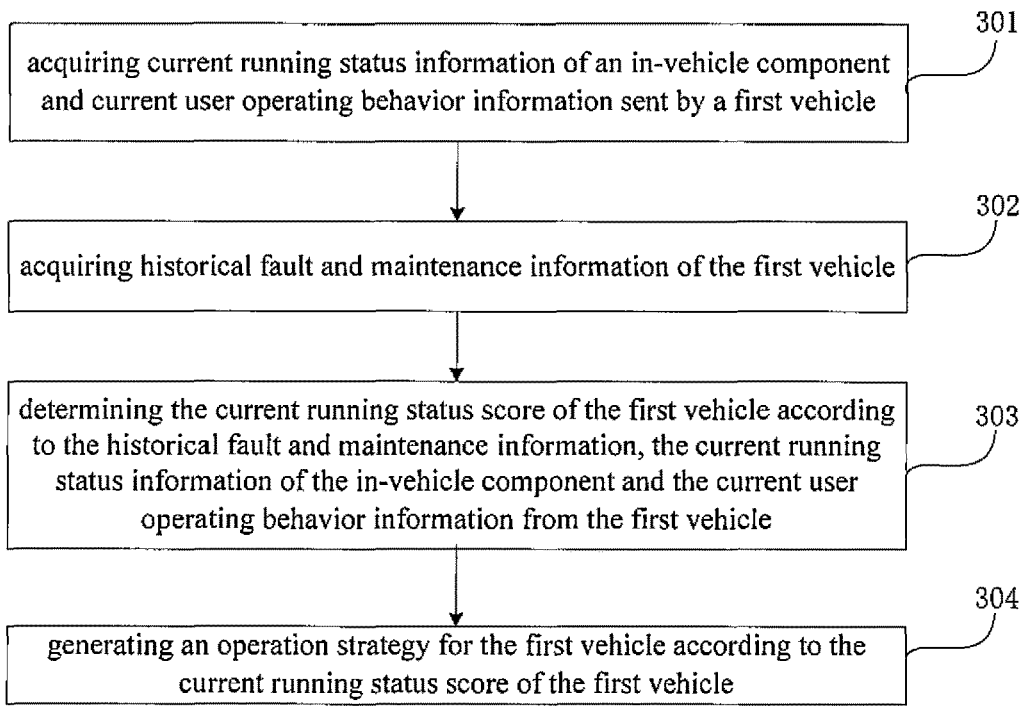
FIG. 3 is a flow chart of a method for controlling vehicle operations according to a still another embodiment of the present disclosure.

FIG. 3 is a flow chart of a method for controlling vehicle operations according to a still another embodiment of the present disclosure. As shown in FIG. 3, the method includes following steps.

In block 301, current running status information of an in-vehicle component and current user operating behavior information sent by a first vehicle are acquired.

In block 302, historical fault and maintenance information of the first vehicle is acquired.

Alternatively, the historical fault and maintenance information of the first vehicle may be acquired in following ways.

In an embodiment, the historical fault and maintenance information of a vehicle is acquired by using a vehicle identification number (VIN) of the vehicle.

Specifically, the VIN is a unique identifier of the vehicle, such that the historical fault and maintenance information of the vehicle can be acquired in a corresponding inquiry system according to the VIN of the vehicle.

In another embodiment, the historical fault and maintenance information of the vehicle is acquired from a dealer management system (DMS).

Specifically, the DMS includes all the information such as purchase and maintenance of the vehicle.

The DMS is usually provided by an Automobile 4S shop which is a four-in-one automobile enterprise integrating Sale, Sparepart, Service and Survey, and the historical fault and maintenance information of a vehicle thus can be acquired from the system.

In block 303, the current running status score of the first vehicle is determined according to the historical fault and maintenance information, the current running status information of the in-vehicle component and the current user operating behavior information from the first vehicle.

After a vehicle is repaired, performance of a repaired component of the vehicle may be degraded. In view of this, it is more accurate to determine the current running status score of the first vehicle according to the historical fault and maintenance information, the current running status information of the in-vehicle component and the current user operating behavior information from, the first vehicle, and the score of the first vehicle may better in consistent with the actual performances of the vehicle.

In block 304, an operation strategy for the first vehicle is generated according to the current running status score of the first vehicle.

With the method for controlling vehicle operations provided in the embodiments of the present disclosure, the current running status information of the in-vehicle component and the current user operating behavior information, and the historical fault and maintenance information are acquired, and the current running status score of the first vehicle is determined according to the historical fault and maintenance information, the current running status information of the in-vehicle component and the current user operating behavior information from the first vehicle. On this basis, the current running status score of the vehicle may be determined in combination of the historical fault and maintenance information, such that the operation strategy generated according to such a score may have a higher reliability and can be better referenced to.

According to the above analysis, in the embodiment of the present disclosure, the current running status score of the first vehicle is determined according to the historical fault and maintenance information, the current running status information of the in-vehicle component and the current user operating behavior information from the first vehicle, and the operation strategy for the first vehicle is generated according to the current running status score of the first vehicle.

In a further embodiment of the present disclosure, feedback information from a current user corresponding to the first vehicle may be acquired, and the current running status score of the first vehicle may be updated according to the feedback information and thus is more representative. In view of this, the method for controlling vehicle operations of the present disclosure will be specifically described below with reference to FIG. 4.

Figure 4:
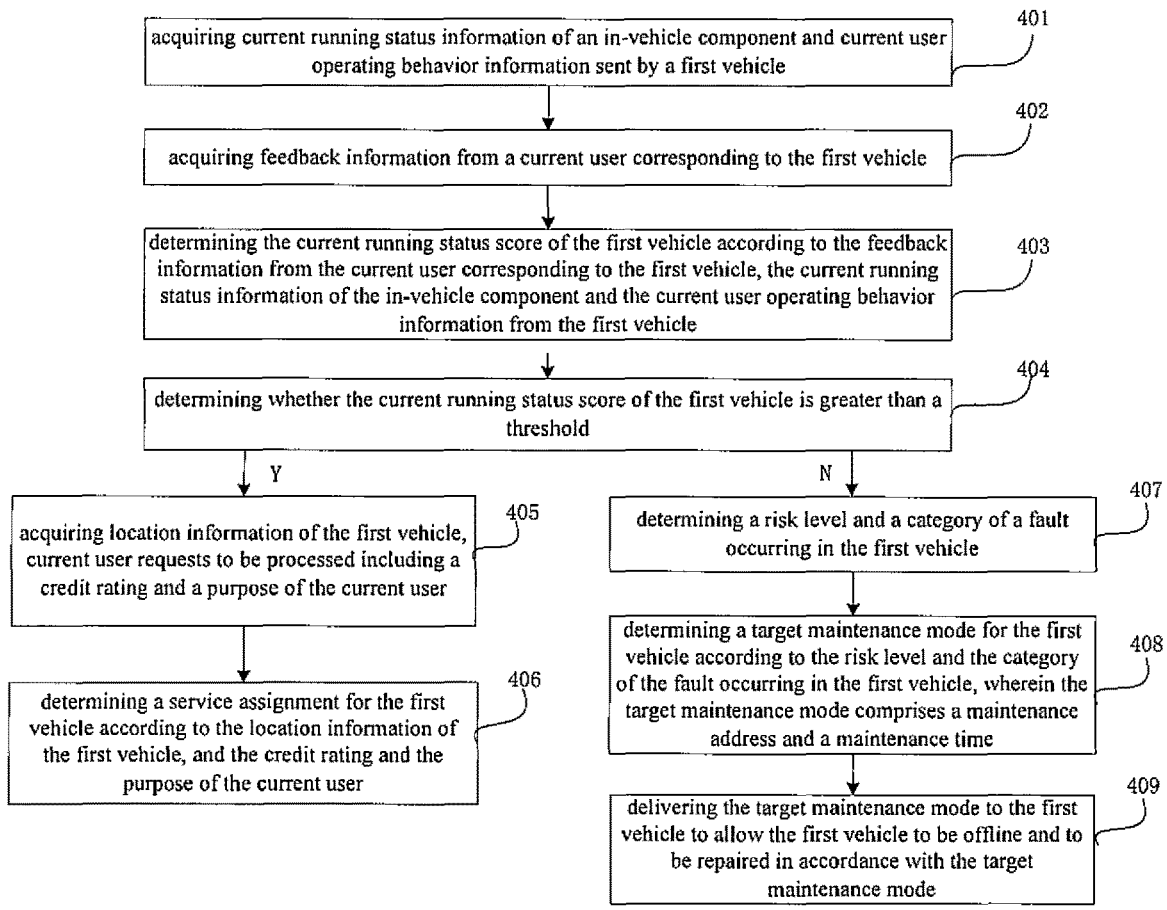
FIG. 4 is a flow chart of a method for controlling vehicle operations according to a further embodiment of the present disclosure.

FIG. 4 is a flow chart of a method for controlling vehicle operations according to a further embodiment of the present disclosure. As shown in FIG. 4, the method for controlling vehicle operations includes following steps.

In block 401, current running status information of an in-vehicle component and current user operating behavior information sent by a first vehicle are acquired.

In block 402, feedback information from a current user corresponding to the first vehicle is acquired.

Alternatively, the feedback information from the current user corresponding to the first vehicle may be acquired in following ways.

In an embodiment, a data acquisition instruction is sent to a terminal of a user currently using the first vehicle, so as to acquire the feedback information from the user.

Specifically, the terminal of the user may be, but not limited to, an in-vehicle multimedia device and a mobile phone.

In this embodiment, the information acquisition instruction may be sent to the terminal of the user currently using the vehicle through a wireless network, 3G, 4G, 5G or the like.

In an embodiment, after the data acquisition instruction is received by the terminal, a prompt message of e.g. "please input the use experience" is displayed in a display screen, and information of the use experience input by the user is received and fed back to a computer device as the feedback information. Specifically, in this embodiment, the information of the use experience may be input in voice or by keyboard.

Alternatively, a plurality of questions may be sequentially displayed in the display screen, feedback information is generated according to a result selected by the user who uses the vehicle, and the generated feedback information is sent to the computer device.

For example, in the display screen of the terminal of the user, a first question "Will the vehicle speed up quickly?" and corresponding answers to be selected "Yes" and "Not felt" are displayed. If the user selects "Yes", a second question "Is the vehicle stable during driving compared to ordinary vehicles?" and corresponding answers to be selected "Yes" and "Not known" are displayed on the screen. If the user selects "Not known", a third question "will you recommend this vehicle to others?" and corresponding answers to be selected "Yes" and "No" are displayed on the screen. If the user selects "Yes", a message "Thank you for your feedback information" is displayed. On this basis, the terminal of the user may generate the feedback information according to the selected results, for example, the feedback information may be "the vehicle speeds up quickly, the user does not know if the vehicle is more stable than other vehicles, and the user will recommend this vehicle to others", and such information will be sent to the computer device.

In another embodiment, the feedback information from the terminal of the user is received.

After the user uses the first vehicle, the user can actively feedback the user experience to the computer device, such that the computer device may timely adjust the operations of the first vehicle according to the feedback information from the user, and thus the first vehicle may be better operated to meet the needs of the user.

In block 403, the current running status score of the first vehicle is determined according to the feedback information from the current user corresponding to the first vehicle, the current running status information of the in-vehicle component and the current user operating behavior information from the first vehicle.

Alternatively, after the feedback information from the current user corresponding to the first vehicle is acquired, the computer device may input the feedback information from the current user corresponding to the first vehicle, the current running status information of the in-vehicle component and the current user operating behavior information from the first vehicle in to a preset model as input data, and the feedback information from the current user corresponding to the first vehicle, the current running status information of the in-vehicle component and the current user operating behavior information may be calculated in such a preset model, so as to determine the current running status score of the first vehicle.

Further, after the current running status score of the first vehicle is determined, the current running status score may be further compared with a threshold, and the operation strategy for the first vehicle will be determined according to the comparison result. In view of this, the method for controlling vehicle operations in embodiments of the present disclosure is specifically described below with following steps 404 to 409.

In block 404, it is determined whether the current running status score of the first vehicle is greater than a threshold, if yes, block 405 is performed, otherwise block 407 is performed.

Specifically, the threshold is set on the basis of actual running status, which is not specified herein.

Alternatively, the current running status score is compared with the threshold, and the operation strategy for the first vehicle is determined according to the comparison result.

In block 405, if the current running status score of the first vehicle is greater than the threshold, location information of the first vehicle, current user requests to be processed including a credit rating and a purpose of the current user are acquired.

In block 406, a service assignment for the first vehicle is determined according to the location information of the first vehicle, and the credit rating and the purpose of the current user.

Alternatively, when the current running status score of the first vehicle is greater than the threshold, it indicates that the current running status of the first vehicle is good, and normal running operations are able to be performed. At this time, the computer device can acquire the location information of the first vehicle, and the credit rating and the purpose of the current user to determine the service assignment for the first vehicle.

Specifically, the location information of the first vehicle is determined by a global positioning system (GPS), the credit rating of the user is determined according to account information currently registered, and the purpose of the user is determined by analyzing historical use records of the user or by receiving the use demands input by the user.

Further, the computer device may determine the service assignment for the first vehicle according to the location information of the first vehicle, and the credit rating and the purpose of the current user.

For example, location information of a first vehicle is "Cishousi Subway Station-I Port", a credit rating of a user X1 is A, a credit rating of a user X2 is AA, a credit rating of a user X3 is AAA. A purpose of the use X1 is "to go to XX airport at 9:00 a.m. tomorrow", a purpose of the user X2 is "to go to XX hospital at 2:30 this afternoon", and a purpose of the user X3 is "to go to Beijing West Railway Station", such that the service assignment for the first vehicle may be generated according to the location information of the first vehicle, the credit ratings and the purposes of the above three current users, and the assignment for the first vehicle includes picking up the user X3 to go to the Beijing West Railway Station right now, picking up the user X2 at 2:30 this afternoon to the XX hospital and picking up the user X1 at 9:00 a.m. tomorrow to the XX airport.

In block 407, if the current running status score of the first vehicle is less than or equal to the threshold, a risk level and a category of a fault occurring in the first vehicle is determined.

In block 408, a target maintenance mode for the first vehicle is determined according to the risk level and the category of the fault occurring in the first vehicle, in which the target maintenance mode includes a maintenance address and a maintenance time.

In this embodiment, the risk level of the fault may be adaptively set according to actual needs, for example, the risk level may include a normal level and a dangerous level.

The risk category of the fault may be adaptively set according to performances of the vehicle, for example, the category may include a brake being insensitive, an engine being non-rotated and an indicator light being not bright.

Specifically, when the current running status score of the first vehicle is less than or equal to the threshold, it indicates that the current running status of the first vehicle is poor, and a fault may occur. At this time, the first vehicle may be detected by a general or special instrument device, and the risk level and category of the fault of the first vehicle may be determined.

Further, the target maintenance mode for the first vehicle is determined according to the risk level and the category of the fault occurring in the first vehicle.

Alternatively, in an embodiment, maintenance address and fault maintenance type, and current maintenance task to be processed corresponding to each of maintenance shops may be acquired, and candidate maintenance shops may be determined from the maintenance shops according to the category of the fault occurring in the first vehicle, and a target maintenance shop may be selected from the candidate maintenance shops and maintenance time for the first vehicle may be determined according to the risk level of the fault occurring in the first vehicle.

In other words, in embodiment of the present disclosure, the step of determining the target maintenance mode for the first vehicle includes:

acquiring a fault maintenance type and a current maintenance task to be processed corresponding to the maintenance address;

determining a candidate maintenance address according to the fault maintenance type corresponding to the maintenance address and the category of the fault occurring in the first vehicle; and determining the maintenance address and the maintenance time for the first vehicle according to a risk level in the maintenance task currently to be processed by the candidate maintenance address and the risk level of the fault occurring in the first vehicle.

For example, five maintenance addresses of Y1, Y2, Y3, Y4 and Y5 are acquired, the fault maintenance types corresponding to the maintenance addresses are Q1; Q1 and Q2; Q2 and Q3; Q1, Q2 and Q4; and Q4 and Q5, respectively, and the amounts of the current maintenance tasks to be processed corresponding to the five maintenance addresses are 0, 3, 2, 1 and 6, respectively. On this basis, when the category of the fault of the first vehicle is Q2, Y2, Y3 and Y4 are the candidate maintenance addresses. It is known that the current maintenance tasks to be processed corresponding to Y2, Y3 and Y4 are 3, 2 and 1, respectively. Moreover, among the three addresses, Y4 has a lowest risk level in the maintenance task currently to be processed and a least processing duration, and thus it is determined that Y4 is the maintenance address for the first vehicle, and the maintenance time is determined to be a time once the current maintenance task to be processed has been done.

Further, when a plurality of the candidate maintenance addresses exists, these candidate maintenance addresses may be sent to the first vehicle such that the user currently using the first vehicle may select maintenance address according to the needs of the user. In another embodiment, the candidate maintenance addresses may be ranked in sequence according to a distance between the current location of the first vehicle and a candidate maintenance address, and then sent to the first vehicle, such that a nearest maintenance address may be displayed first.

In block 409, the target maintenance mode is delivered to the first vehicle to allow the first vehicle to be offline and to be repaired in accordance with the target maintenance mode.

Alternatively, by delivering the target maintenance mode to the first vehicle, the first vehicle may be repaired timely, such that the running status of the first vehicle can be recovered better, thus improving safety and reliability during the operations of the first vehicle.

With the method for controlling vehicle operations provided in the embodiments of the present disclosure, the feedback information from the current user corresponding to the first vehicle is acquired, the current running status score of the first vehicle is determined according to the feedback information from the current user corresponding to the first vehicle, the current running status information of the in-vehicle component and the current user operating behavior information from the first vehicle, and it is determined whether the current running status score of the first vehicle is greater than the threshold, if the current running status score of the first vehicle is greater than the threshold, the service assignment for the first vehicle is determined according to the location information of the first vehicle, and the current user requests to be processed including the credit rating and the purpose of the current user; and if the current running status score of the first vehicle is less than or equal to the threshold, the target maintenance mode for the first vehicle is determined according to the risk level and the category of the fault occurring in the first vehicle and the target maintenance mode is delivered to the first vehicle to allow the first vehicle to be offline and to be repaired in accordance with the target maintenance mode. Therefore, the vehicle can be operated and managed according to its current running status, so as to improve the efficiency of the vehicle operation and ensure the safety and reliability during the operation of the vehicle at the same time, thus improving user experience.

In another aspect, the present disclosure provides in embodiments an apparatus for controlling vehicle operations.

Figure 5:
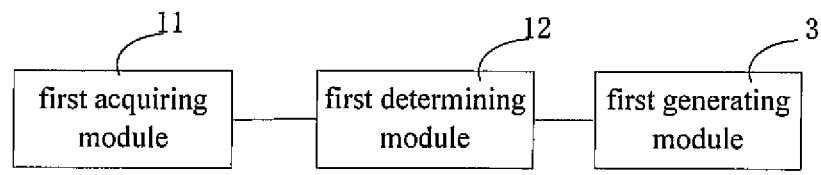
FIG. 5 is a block diagram showing a structure of an apparatus for controlling vehicle operations according to an embodiment of the present disclosure.

FIG. 5 is a block diagram showing a structure of an apparatus for controlling vehicle operations according to an embodiment of the present disclosure. As shown in FIG. 5, the apparatus for controlling vehicle operations includes a first acquiring module 11, a first determining module 12 and a first generating module 13.

Specifically, the first acquiring module 11 is configured to acquire current running status information of an in-vehicle component and current user operating behavior information sent by a first vehicle. The first determining module 12 is configured to determine a current running status score of the first vehicle according to the current running status information of the in-vehicle component and the current user operating behavior information from the first vehicle. The first generating module 13 is configured to generate an operation strategy for the first vehicle according to the current running status score of the first vehicle.

It should be understood that all of the above described features and advantages for the method for controlling vehicle operations in the above embodiments are also applicable to the apparatus for controlling vehicle operations, which will not be elaborated in detail herein.

With the apparatus for controlling vehicle operations provided in the embodiments of the present disclosure, the current running status information of the in-vehicle component and the current user operating behavior information sent by the first vehicle are acquired, the current running status score of the first vehicle is determined according to the current running status information of the in-vehicle component and the current user operating behavior information from the first vehicle, and the operation strategy for the first vehicle is generated according to the current running status score of the first vehicle. On this basis, the running status of the vehicle can be determined according to the running status of the in-vehicle component and the user operating behavior, and the vehicle can be timely and effectively managed according to the running status of the vehicle, thus improving the efficiency of the vehicle operation and also providing conditions for realizing automation and intelligent management of the vehicle.

Figure 6:
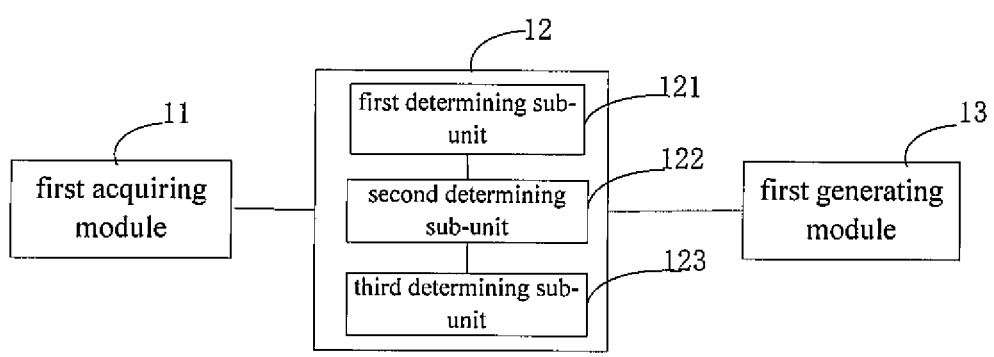
FIG. 6 is a block diagram showing a structure of an apparatus for controlling vehicle operations according to another embodiment of the present disclosure.

FIG. 6 is a block diagram showing a structure of an apparatus for controlling vehicle operations according to another embodiment of the present disclosure. As shown in FIG. 6, the apparatus for controlling the vehicle operations includes a first acquiring module 11, a first determining module 12 and a first generating module 13.

Specifically, the first acquiring module 11 is configured to acquire current running status information of an in-vehicle component and current user operating behavior information sent by a first vehicle. The current running status information of the in-vehicle component includes a current version of the in-vehicle component and a duration for which the in-vehicle component has been worked. The first determining module 12 is configured to determine a current running status score of the first vehicle according to the current running status information of the in-vehicle component and the current user operating behavior information from the first vehicle. The first generating module 13 is configured to generate an operation strategy for the first vehicle according to the current running status score of the first vehicle.

In an embodiment of the present disclosure, the first determining module 12 includes a first determining sub-unit 121, a second determining sub-unit 122 and a third determining sub-unit 123.

Specifically, the first determining sub-unit 121 is configured to determine a plurality of second vehicles corresponding to the first vehicle according to the current version of the in-vehicle component and the duration for which the in-vehicle component has been worked of the first vehicle, in which each second vehicle has a current version of an in-vehicle component and a duration for which the in-vehicle component has been worked same as those of the first vehicle. The second determining sub-unit 122 is configured to determine a current initial score of the first vehicle according to historical running status scores of the plurality of second vehicles. The third determining sub-unit 123 is configured to update the current initial score of the first vehicle according to type and quantity of each operating behavior included in the current user operating behavior information to determine the current running status score of the first vehicle.

It should be understood that all of the above described features and advantages for the method for controlling vehicle operations in the above embodiments are also applicable to the apparatus for controlling vehicle operations, which will not be elaborated in detail herein.

With the apparatus for controlling vehicle operations provided in the embodiments of the present disclosure, the plurality of second vehicles corresponding to the first vehicle are determined according to the current version of the in-vehicle component and the duration for which the in-vehicle component has been worked of the first vehicle, the current initial score of the first vehicle is determined according to the historical running status scores of the plurality of second vehicles, and the current initial score of the first vehicle is updated according to the current user operating behavior information from the first vehicle to determine the current running status score of the first vehicle, and the operation strategy for the first vehicle is generated according to the current running status score of the first vehicle, such that the operation strategy is generated more relatively for the vehicle, thus realizing a personalized operating management of the vehicle.

Figure 7:
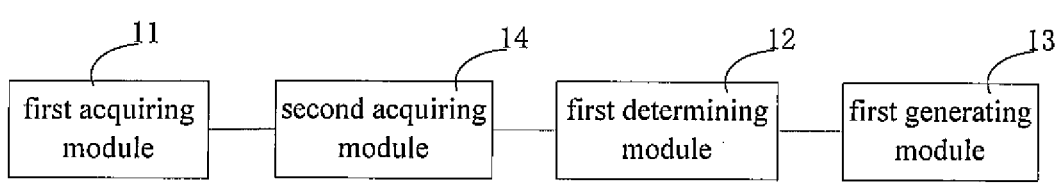
FIG. 7 is a block diagram showing a structure of an apparatus for controlling vehicle operations according to still another embodiment of the present disclosure.

FIG. 7 is a block diagram showing a structure of an apparatus for controlling vehicle operations according to still another embodiment of the present disclosure. As shown in FIG. 7, the apparatus for controlling the vehicle operations includes a first acquiring module 11, a first determining module 12, a first generating module 13 and a second acquiring module 14.

Specifically, the first acquiring module 11 is configured to acquire current running status information of an in-vehicle component and current user operating behavior information sent by a first vehicle. The first determining module 12 is configured to determine a current running status score of the first vehicle according to the current running status information of the in-vehicle component and the current user operating behavior information from the first vehicle. The first generating module 13 is configured to generate an operation strategy for the first vehicle according to the current running status score of the first vehicle.

In this embodiment, the apparatus further includes the second acquiring module 14 configured to acquire historical fault and maintenance information of the first vehicle.

In an embodiment, the first determining module 12 is specifically configured to determine the current running status score of the first vehicle according to the historical fault and maintenance information, the current running status information of the in-vehicle component and the current user operating behavior information from the first vehicle.

It should be understood that all of the above described features and advantages for the method for controlling vehicle operations in the above embodiments are also applicable to the apparatus for controlling vehicle operations, which will not be elaborated in detail herein.

With the apparatus for controlling vehicle operations provided in the embodiments of the present disclosure, the current running status information of the in-vehicle component and the current user operating behavior information, and the historical fault and maintenance information are acquired, and the current running status score of the first vehicle is determined according to the historical fault and maintenance information, the current running status information of the in-vehicle component and the current user operating behavior information from the first vehicle. On this basis, the current running status score of the vehicle may be determined in combination of the historical fault and maintenance information, such that the operation strategy generated according to such a score may have a higher reliability and can be better referenced to.

Figure 8:
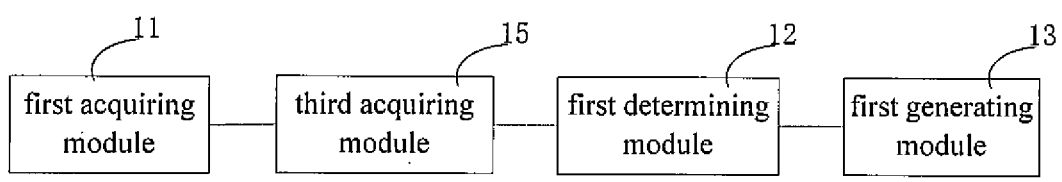
FIG. 8 is a block diagram showing a structure of an apparatus for controlling vehicle operations according to a further embodiment of the present disclosure.

FIG. 8 is a block diagram showing a structure of an apparatus for controlling vehicle operations according to a further embodiment of the present disclosure. As shown in FIG. 8, the apparatus for controlling the vehicle operations includes a first acquiring module 11, a first determining module 12, a first generating module 13 and a third acquiring module 15.

Specifically, the first acquiring module 11 is configured to acquire current running status information of an in-vehicle component and current user operating behavior information sent by a first vehicle. The first determining module 12 is configured to determine a current running status score of the first vehicle according to the current running status information of the in-vehicle component and the current user operating behavior information from the first vehicle. The first generating module 13 is configured to generate an operation strategy for the first vehicle according to the current running status score of the first vehicle.

In this embodiment, the apparatus further includes the third acquiring module 15 configured to acquire feedback information from a current user corresponding to the first vehicle.

In an embodiment, the first determining module 12 is specifically configured to determine the current running status score of the first vehicle according to the feedback information from the current user corresponding to the first vehicle, the current running status information of the in-vehicle component and the current user operating behavior information from the first vehicle In an embodiment, if the current running status score of the first vehicle is greater than a threshold, the first generating module 13 is configured to acquire location information of the first vehicle, current user requests to be processed including a credit rating and a purpose of the current user, and determine a service assignment for the first vehicle according to the location information of the first vehicle, and the credit rating and the purpose of the current user.

In another embodiment, if the current running status score of the first vehicle is less than or equal to the threshold, the first generating module 13 further includes a fourth determining sub-unit, a fifth determining sub-unit and a control unit.

Specifically, the fourth determining sub-unit is configured to determine a risk level and a category of a fault occurring in the first vehicle. The fifth determining sub-unit is configured to determine a target maintenance mode for the first vehicle according to the risk level and the category of the fault occurring in the first vehicle, in which the target maintenance mode comprises a maintenance address and a maintenance time. The control unit is configured to deliver the target maintenance mode to the first vehicle to allow the first vehicle to be offline and to be repaired in accordance with the target maintenance mode.

In a further embodiment, the fifth determining sub-unit is specifically configured to acquire a fault maintenance type and a current maintenance task to be processed corresponding to the maintenance address; determine a candidate maintenance address according to the fault maintenance type corresponding to the maintenance address and the category of the fault occurring in the first vehicle; and determine the maintenance address and the maintenance time for the first vehicle according to a risk level in the maintenance task currently to be processed by the candidate maintenance address and the risk level of the fault occurring in the first vehicle.

It should be understood that all of the above described features and advantages for the method for controlling vehicle operations in the above embodiments are also applicable to the apparatus for controlling vehicle operations, which will not be elaborated in detail herein.

With the apparatus for controlling vehicle operations provided in the embodiments of the present disclosure, the feedback information from the current user corresponding to the first vehicle is acquired, the current running status score of the first vehicle is determined according to the feedback information from the current user corresponding to the first vehicle, the current running status information of the in-vehicle component and the current user operating behavior information from the first vehicle, and it is determined whether the current running status score of the first vehicle is greater than the threshold, if the current running status score of the first vehicle is greater than the threshold, the service assignment for the first vehicle is determined according to the location information of the first vehicle, and the current user requests to be processed including the credit rating and the purpose of the current user; and if the current running status score of the first vehicle is less than or equal to the threshold, the target maintenance mode for the first vehicle is determined according to the risk level and the category of the fault occurring in the first vehicle and the target maintenance mode is delivered to the first vehicle to allow the first vehicle to be offline and to be repaired in accordance with the target maintenance mode. Therefore, the vehicle can be operated and managed according to its current running status, so as to improve the efficiency of the vehicle operation and ensure the safety and reliability during the operation of the vehicle at the same time, thus improving user experience.

In still another aspect, the present disclosure provides in embodiments a computer device.

Figure 9:
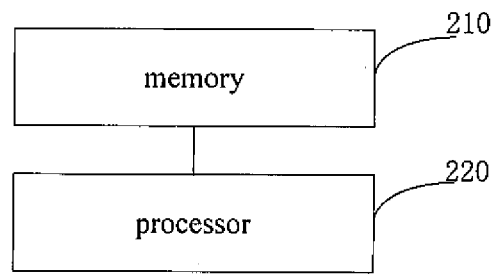
FIG. 9 is a block diagram showing a computer device according to an embodiment of the present disclosure.

FIG. 9 is a block diagram showing a computer device according to an embodiment of the present disclosure. The computer device shown in FIG. 9 is illustrated and shall not be construed to limit the present disclosure.

As illustrated in FIG. 9, the computer device 200 includes a memory 210, a processor 220, and computer programs stored in the memory 210 and executable by the processor 220. When executing the computer programs, the processor 220 is configured to perform a method for controlling vehicle operations as described above.

Figure 10:
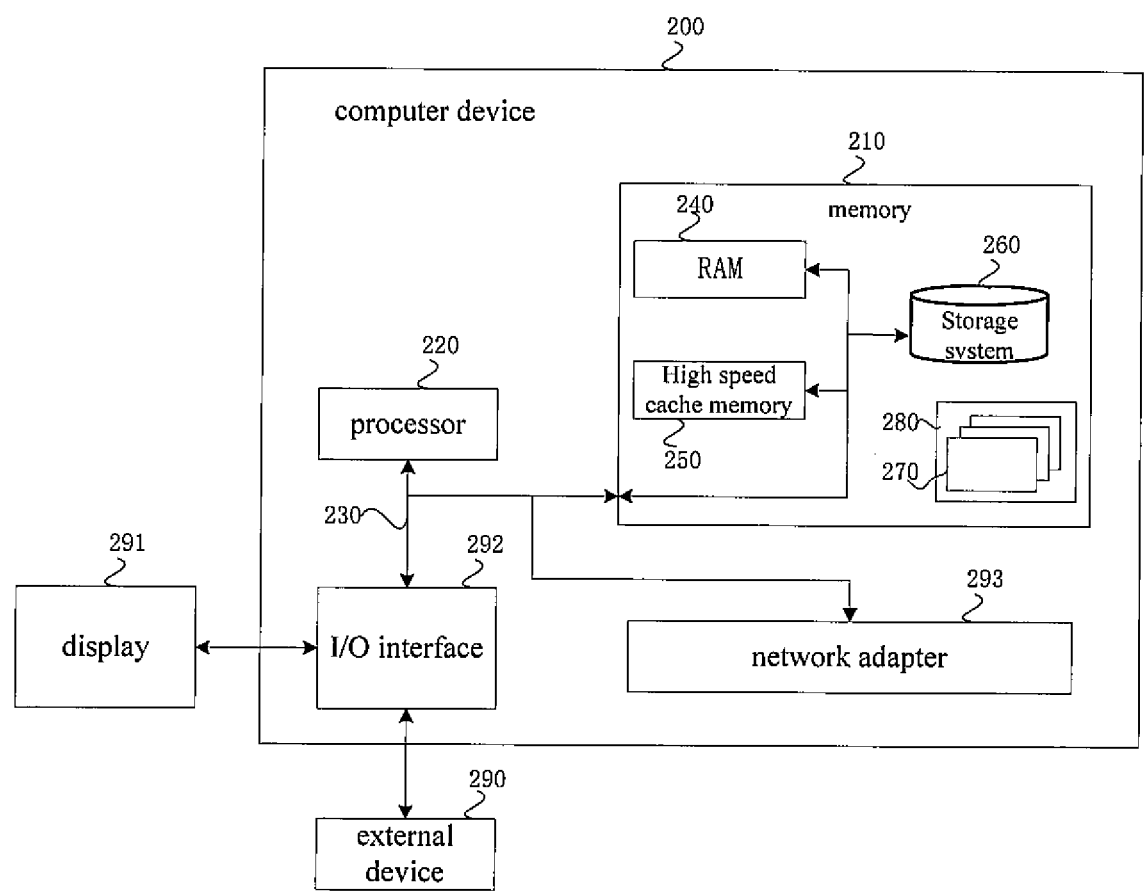
FIG. 10 is a block diagram showing a computer device according to another embodiment of the present disclosure.

In another embodiment, as shown in FIG. 10, the computer device 200 further includes a memory 210, a processor 220, a bus 230 connecting various system components including the memory 210 and the processor 220. The memory 210 stores computer programs that, when executed by the processor 220, cause the processor 220 to perform a method for controlling vehicle operations as described above.

The bus 230 represents one or more of several types of bus structures, including a memory bus or a memory controller, a peripheral bus, a graphics acceleration port, a processor, or a local bus using any of a variety of bus structures. For example, these architectures may be, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (hereinafter referred to as PCI) bus.

The computer device 200 typically includes a variety of computer system readable media. These media may be any available media accessible by the computer device 200 and includes both volatile and non-volatile media, removable and non-removable media.

The memory 210 may include a computer system readable medium in the form of volatile memory, such as a random access memory 240 (hereinafter referred to as RAM) and/or a high speed cache memory 250. The computer device 200 may further include other removable or non-removable, volatile or non-volatile computer system storage media. By way of example only, the storage system 260 may be configured to read and write a non-removable and non-volatile magnetic media (not shown in FIG. 10, commonly referred to as a "hard drive"). Although not shown in FIG. 10, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media may be provided. In these cases, each driver may be connected to the bus 230 via one or more data medium interfaces. The memory 210 may include at least one program product. The program product has a set (such as, at least one) of program modules configured to perform the functions of various embodiments of the present disclosure.

A program/utility 280 having a set (at least one) of the program modules 270 may be stored in, for example, the memory 210. The program modules 270 include but are not limited to, an operating system, one or more application programs, other programs modules, and program data. Each of these examples, or some combination thereof, may include an implementation of a network environment. The program modules 270 generally perform the functions and/or methods in the embodiments described herein.

The computer device 200 may also communicate with one or more external devices 290 (such as, a keyboard, a pointing device, a display 291, etc.). Furthermore, the computer device 200 may also communicate with one or more communication devices enabling a user to interact with the computer device 200 and/or other devices (such as a network card, modem, etc.) enabling the computer device 292 to communicate with one or more computer devices. This communication can be performed via the input/output (I/O) interface 292. Moreover, the computer device 200 may communicate with one or more networks (such as a local area network (hereafter referred to as LAN), a wide area network (hereafter referred to as WAN) and/or a public network such as an Internet) through a network adapter 293. As shown in FIG. 10, the network adapter 293 communicates with other modules of the computer device 200 over the bus 230. It should be understood that, although not shown in FIG. 10, other hardware and/or software modules may be used in connection with the computer device 200. The hardware and/or software includes, but is not limited to, microcode, device drivers, redundant processing units, external disk drive arrays, RAID systems, Drive and data backup storage system.

It should be understood that implementation processes and technical principles of the computer device of this embodiment may refer to the description of the method for controlling vehicle operations as provided in the above embodiments, which will not be elaborated in detail herein.

With the computer device provided in the embodiments of the present disclosure, the current running status information of the in-vehicle component and the current user operating behavior information sent by the first vehicle are acquired, the current running status score of the first vehicle is determined according to the current running status information of the in-vehicle component and the current user operating behavior information from the first vehicle, and the operation strategy for the first vehicle is generated according to the current running status score of the first vehicle. On this basis, the running status of the vehicle can be determined according to the running status of the in-vehicle component and the user operating behavior, and the vehicle can be timely and effectively managed according to the running status of the vehicle, thus improving the efficiency of the vehicle operation and also providing conditions for realizing automation and intelligent management of the vehicle.

In a further aspect, the present disclosure provides in embodiments a non-temporary computer-readable storage medium.

Specifically, the non-temporary computer-readable storage medium has stored therein computer programs that, when executed by a processor, cause the processor to perform a method for controlling vehicle operations as described above.

The above non-temporary computer-readable storage medium including the computer executable instruction may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing a program. The program may be used by an instruction executed system, apparatus or device, or a connection thereof.

The computer readable signal medium may include a data signal propagating in baseband or as part of a carrier which carries a computer readable program code. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport a program used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional Procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

In a further aspect, the present disclosure provides in embodiments a computer product having stored therein instructions that, when executed by a processor of a device, causes the device to perform a method for controlling vehicle operations as described above.

In the present disclosure, unless specified or limited otherwise, the terms "connected", "coupled" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Reference throughout this specification to "an embodiment", "another embodiments", "a further embodiment", "a specific embodiment" or "some embodiments" means that a particular feature, structure, material, or characteristic described in connection with the embodiment or example is included in at least one embodiment or example of the present disclosure.

In addition, terms such as "first" and "second" are used herein for purposes of description and are not intended to indicate or imply relative importance or significance. Thus, the feature defined with "first" and "second" may comprise one or more this feature.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA).

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling vehicle operations using a computer device comprising a processor and memory to perform
    acquiring current running status information of an in-vehicle component and current user operating behavior information sent by a first vehicle;
    determining a current running status score of the first vehicle according to the current running status information of the in-vehicle component and the current user operating behavior information from the first vehicle; and
    generating an operation strategy for the first vehicle according to the current running status score of the first vehicle;
    wherein after determining the current running status score of the first vehicle, the method further comprises:
    determining whether the current running status score of the first vehicle is greater than a threshold,
    if the current running status score of the first vehicle is greater than the threshold, generating the operation strategy for the first vehicle comprises:
        acquiring location information of the first vehicle, current user requests to be processed including a credit rating and a purpose of the current user, and
        determining a service assignment for the first vehicle according to the location information of the first vehicle, and the credit rating and the purpose of the current user,
    or
    if the current running status score of the first vehicle is less than or equal to the threshold, generating the operation strategy for the first vehicle comprises:
        determining a risk level and a category of a fault occurring in the first vehicle,
        determining a target maintenance mode for the first vehicle according to the risk level and the category of the fault occurring in the first vehicle, wherein the target maintenance mode comprises a maintenance address and a maintenance time, and
        delivering the target maintenance mode to the first vehicle to allow the first vehicle to be offline and to be repaired in accordance with the target maintenance mode.

2. The method according to claim 1, wherein the current running status information of the in-vehicle component comprises a current version of the in-vehicle component and a duration for which the in-vehicle component has been worked.

3. The method according to claim 2, wherein determining the current running status score of the first vehicle comprises:
    determining a plurality of second vehicles corresponding to the first vehicle according to the current version of the in-vehicle component and the duration for which the in-vehicle component has been worked of the first vehicle, wherein each second vehicle has a current version of an in-vehicle component and a duration for which the in-vehicle component has been worked same as those of the first vehicle;
    determining a current initial score of the first vehicle according to historical running status scores of the plurality of second vehicles; and
    updating the current initial score of the first vehicle according to type and quantity of each operating behavior included in the current user operating behavior information to determine the current running status score of the first vehicle.

4. The method according to claim 1, wherein before determining the current running status score of the first vehicle, the method further comprises:
    acquiring historical fault and maintenance information of the first vehicle.

5. The method according to claim 4, wherein determining the current running status score of the first vehicle comprises:
    determining the current running status score of the first vehicle according to the historical fault and maintenance information, the current running status information of the in-vehicle component and the current user operating behavior information from the first vehicle.

6. The method according to claim 1, wherein before determining the current running status score of the first vehicle, the method further comprises:
    acquiring feedback information from a current user corresponding to the first vehicle.

7. The method according to claim 6, wherein determining the current running status score of the first vehicle comprises:
    determining the current running status score of the first vehicle according to the feedback information from the current user corresponding to the first vehicle, the current running status information of the in-vehicle component and the current user operating behavior information from the first vehicle.

8. The method according to claim 1, wherein determining the target maintenance mode for the first vehicle according to the risk level and the category of the fault occurring in the first vehicle comprises:
    acquiring a fault maintenance type and a current maintenance task to be processed corresponding to the maintenance address;
    determining a candidate maintenance address according to the fault maintenance type corresponding to the maintenance address and the category of the fault occurring in the first vehicle; and
    determining the maintenance address and the maintenance time for the first vehicle according to a risk level in the maintenance task currently to be processed by the candidate maintenance address and the risk level of the fault occurring in the first vehicle.

9. A computer device, comprising: a processor; and
a memory for storing computer programs executable by the processor;
wherein the processor is configured to, when executing the computer programs:
acquire current running status information of an in-vehicle component and current user operating behavior information sent by a first vehicle;
determine a current running status score of the first vehicle according to the current running status information of the in-vehicle component and the current user operating behavior information from the first vehicle;
generate an operation strategy for the first vehicle according to the current running status score of the first vehicle; and
determine whether the current running status score of the first vehicle is greater than a threshold,
wherein if the current running status score of the first vehicle is greater than the threshold, the processor is configured to generate the operation strategy for the first vehicle by:
acquiring location information of the first vehicle, current user requests to be processed including a credit rating and a purpose of the current user, and
determining a service assignment for the first vehicle according to the location information of the first vehicle, and the credit rating and the purpose of the current user,
or
if the current running status score of the first vehicle is less than or equal to the threshold, generating the operation strategy for the first vehicle comprises:
determining a risk level and a category of a fault occurring in the first vehicle,
determining a target maintenance mode for the first vehicle according to the risk level and the category of the fault occurring in the first vehicle, wherein the target maintenance mode comprises a maintenance address and a maintenance time, and
delivering the target maintenance mode to the first vehicle to allow the first vehicle to be offline and to be repaired in accordance with the target maintenance mode.

10. The computer device according to claim 9, wherein the current running status information of the in-vehicle component comprises a current version of the in-vehicle component and a duration for which the in-vehicle component has been worked.

11. The computer device according to claim 10, wherein determining the current running status score of the first vehicle comprises:
determining a plurality of second vehicles corresponding to the first vehicle according to the current version of the in-vehicle component and the duration for which the in-vehicle component has been worked of the first vehicle, wherein each second vehicle has a current version of an in-vehicle component and a duration for which the in-vehicle component has been worked same as those of the first vehicle;
determining a current initial score of the first vehicle according to historical running status scores of the plurality of second vehicles; and
updating the current initial score of the first vehicle according to type and quantity of each operating behavior included in the current user operating behavior information to determine the current running status score of the first vehicle.

12. The computer device according to claim 9, wherein before determining the current running status score of the first vehicle, the method further comprises:
acquiring historical fault and maintenance information of the first vehicle.

13. The computer device according to claim 12, wherein determining the current running status score of the first vehicle comprises:
determining the current running status score of the first vehicle according to the historical fault and maintenance information, the current running status information of the in-vehicle component and the current user operating behavior information from the first vehicle.

14. A non-transitory computer-readable storage medium having stored therein computer programs that, when executed by a processor, cause the processor to:
acquire current running status information of an in-vehicle component and current user operating behavior information sent by a first vehicle;
determine a current running status score of the first vehicle according to the current running status information of the in-vehicle component and the current user operating behavior information from the first vehicle;
generate an operation strategy for the first vehicle according to the current running status score of the first vehicle; and
determine whether the current running status score of the first vehicle is greater than a threshold,
wherein if the current running status score of the first vehicle is greater than the threshold, generating the operation strategy for the first vehicle comprises:
acquiring location information of the first vehicle, current user requests to be processed including a credit rating and a purpose of the current user, and
determining a service assignment for the first vehicle according to the location information of the first vehicle, and the credit rating and the purpose of the current user, or
if the current running status score of the first vehicle is less than or equal to the threshold, generating the operation strategy for the first vehicle comprises:
determining a risk level and a category of a fault occurring in the first vehicle,
determining a target maintenance mode for the first vehicle according to the risk level and the category of the fault occurring in the first vehicle, wherein the target maintenance mode comprises a maintenance address and a maintenance time, and
delivering the target maintenance mode to the first vehicle to allow the first vehicle to be offline and to be repaired in accordance with the target maintenance mode.

15. The non-transitory computer-readable storage medium according to claim 14, wherein the current running status information of the in-vehicle component comprises a current version of the in-vehicle component and a duration for which the in-vehicle component has been worked.

16. The non-transitory computer-readable storage medium according to claim 15, wherein determining the current running status score of the first vehicle comprises:
determining a plurality of second vehicles corresponding to the first vehicle according to the current version of the in-vehicle component and the duration for which the in-vehicle component has been worked of the first vehicle, wherein each second vehicle has a current version of an in-vehicle component and a duration for which the in-vehicle component has been worked same as those of the first vehicle;

determining a current initial score of the first vehicle according to historical running status scores of the plurality of second vehicles; and updating the current initial score of the first vehicle according to type and quantity of each operating behavior included in the current user operating behavior information to determine the current running status score of the first vehicle.

17. The non-transitory computer-readable storage medium according to claim 14, wherein before determining the current running status score of the first vehicle, the method further comprises:

acquiring historical fault and maintenance information of the first vehicle.

18. The non-transitory computer-readable storage medium according to claim 17, wherein determining the current running status score of the first vehicle comprises:

determining the current running status score of the first vehicle according to the historical fault and maintenance information, the current running status information of the in-vehicle component and the current user operating behavior information from the first vehicle.

* * * * *